United States Patent [19]

Cadwallader

[11] 4,391,544
[45] Jul. 5, 1983

[54] SELF-RETAINED FASTENER

[75] Inventor: James W. Cadwallader, Lansdale, Pa.

[73] Assignee: SPS Technologies, Inc., Jenkintown, Pa.

[21] Appl. No.: 698,669

[22] Filed: Jun. 22, 1976

Related U.S. Application Data

[63] Continuation of Ser. No. 533,103, Dec. 16, 1974, abandoned.

[51] Int. Cl.³ .............................................. F16B 41/00
[52] U.S. Cl. .................................. 403/155; 403/316; 411/352
[58] Field of Search ....................... 403/316, 154, 155; 85/818; 16/169; 151/69; 411/352, 516

[56] References Cited

U.S. PATENT DOCUMENTS

| | | | |
|---|---|---|---|
| 636,331 | 11/1899 | Glover | 16/169 |
| 636,332 | 11/1899 | Glover | 16/169 |
| 1,169,693 | 1/1916 | Swedlund | 24/211 R |
| 1,588,908 | 6/1926 | Reynolds | 403/316 |
| 2,594,239 | 4/1952 | Weiss | 85/818 |
| 3,812,756 | 5/1974 | Wenger | 151/69 X |

*Primary Examiner*—Andrew V. Kundrat
*Attorney, Agent, or Firm*—Aaron Nerenberg

[57] ABSTRACT

A self-retained fastener including locking means provided near the end of the fastener first inserted through a hole in a workpiece wherein the locking means becomes operative after passing beyond the hole in the workpiece. The locking means comprises an annular groove near the end of the fastener having a configuration which increases radially outwardly from a point axially inwardly from the end of the fastener toward the end of the fastener. A spring ferrule member is engaged about the end of the fastener around the annular groove and includes a portion thereof which cooperates with the exterior surface of the workpiece and the annular groove on the fastener to oppose unintentional removal of the fastener from the workpiece once it has passed through the hole in the workpiece. The ferrule also serves as a removal tool for permitting removal of the fastener when desired.

8 Claims, 5 Drawing Figures

SELF-RETAINED FASTENER

This is a continuation of application Ser. No. 533,103, filed Dec. 16, 1974, and now abandoned.

The present invention relates to fasteners and more particularly to self-retained fasteners.

Self-retained fasteners are fastening members in which some feature or aspect is provided that tends to retain the fastener in a workpiece once it has been engaged in the workpiece. Fasteners of this type have particular application in clevis joints to provide an additional aspect of safety in order to insure that the fastener may not be removed unintentionally.

Heretofore, self-retained fasteners have utilized ring spring members and other locking members positioned on the end of the fastener. In many instances, special removal tools have been required to cause disengagement of the locking mechanism to permit removal of the fastener from the workpiece. By the very nature of the locking mechanism, the removal tool was of a special design, so that conventional tools could not be used to disengage the locking mechanism. Upon loss of the special removal tool, the fastener could not be removed from the workpiece without partial or complete destruction of the fastener unit.

Accordingly, it is an object of the present invention to provide a new and improved self-retained fastener which once installed through a hole in a workpiece opposes unintentional withdrawal of the fastener, yet may be removed easily and efficiently from the workpiece when desired.

It is a further object of the present invention to provide such a self-retained fastener which is relatively simple and economical to manufacture and install.

In accordance with a preferred embodiment of the present invention, a fastener member is provided with an annular groove in the fastener shank adjacent the free end thereof. The annular groove includes a shoulder spaced axially inwardly from the free end of the fastener and the groove is formed with a surface which flares outwardly to a second shoulder closer to the free end of the fastener. A spring ferrule member is placed over the free end of the fastener and is provided with a rolled collar segment at its open end which cooperates with the annular groove and the exterior surface of a workpiece to provide a self-retaining feature when the fastener is inserted through a hole in the workpiece.

Other objects and advantages of the present invention will be more readily apparent after consideration of the following specification in conjunction with the accompanying drawing.

Figure 1:
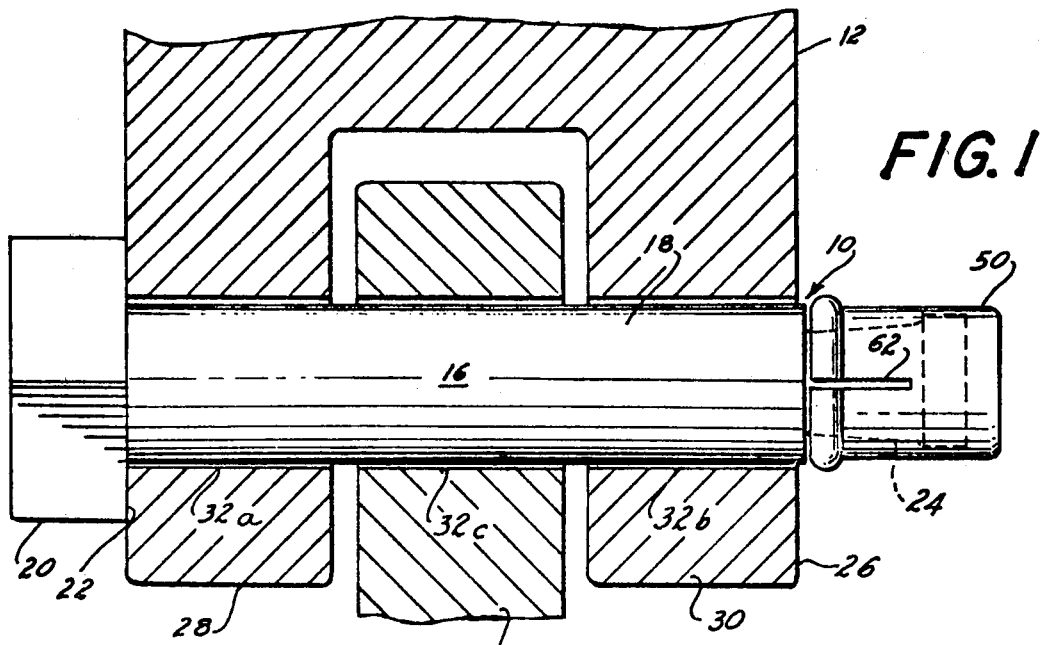
FIG. 1 is an elevational view, partly in section, showing the fastener of the present invention illustratively installed in a clevis joint.
Figure 2:
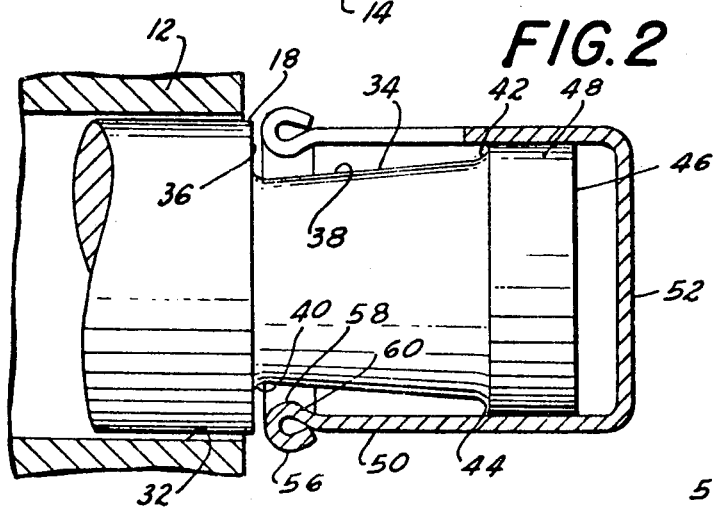
FIG. 2 is an enlarged elevational view, partly in section, showing the fastener of the present invention after installation in a workpiece.
Figure 3:
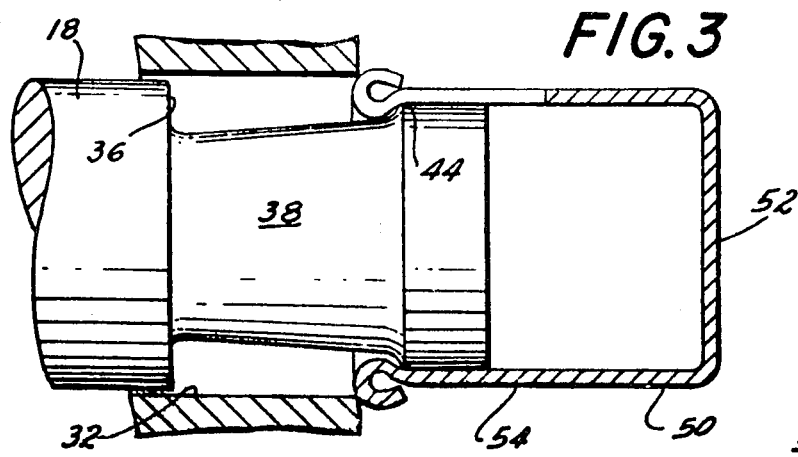
FIG. 3 is a view similar to FIG. 2 showing how the fastener of the present invention cooperates with the workpiece to oppose unintentional removal of the fastener.

With reference to the drawings and particularly FIGS. 1 through 3, a self-retained fastener assembly 10 is shown in an installed position in two workpieces 12 and 14. Fastener assembly 10 includes a pin 16 which includes a shank 18 having a head 20 at one end to provide a workpiece bearing surface 22 and a free end 24 extending beyond the exterior surface 26 of the workpiece 12. In the illustrative embodiment described herein, workpieces 12 and 14 comprise a clevis joint with workpiece 14 pivotally connected between arms 28 and 30 respectively of workpiece 12.

The shank 18 of pin 16 is disposed through receiving bores or holes 32a, 32b, and 32c in workpieces 12 and 14 and may be of any desired grip length as dictated by the thicknesses of workpieces 12 and 14 to be joined. Preferably, the length of shank 18 is slightly greater than the overall length of workpiece 12 in which the pin is installed.

The free end 24 of pin 16 includes an annular groove 34 defined by a shoulder 36 at the end of the shank 18 and a tapered segment 36 in the form of a frusto-cone tapering outwardly from a fillet 40 at the juncture of shoulder 36 and tapered segment 38 to a second fillet 42 and a second shoulder 44 spaced axially inwardly from the end 46 of the pin 16. A short cylindrical segment 48 adjacent shoulder 44 is also provided.

A spring ferrule 50 is engaged over the free end 24 of pin 16 and cooperates, once the pin and spring ferrule have been inserted through a workpiece, with the exterior surface 26 of the workpiece and shoulder 44 on the free end of pin 16 to oppose unintentional removal of the pin from the workpiece.

Ferrule 50 is a cup shaped member formed with an end wall 52 and a substantially cylindrical wall segment 54. The internal diameter of the ferrule 50 within the cylindrical wall segment 54 is equal to or slightly greater than the cross-sectional diameter of cylindrical segment 48 on the free end of pin 16 so that ferrule 50 may slide over the cylindrical segment 48. The cross-sectional diameter of cylindrical segment 48 of pin end 24 is less than the cross-sectional diameter of shank 18 by at least twice the wall thickness of ferrule 50 so that when ferrule 50 is in place on pin 16 its outer diameter is approximately equal to the shank diameter.

The open end of ferrule 50 is formed so that cylindrical wall segment 54 is rolled back upon itself to form a collar segment 56 which is a rounded U-shape in cross-section. The collar segment 56 is formed so that a protrusion 58 extends inwardly with the diameter of the opening across protrusion 58 being less than the internal diameter of the cylindrical segment 54 of the ferrule 50. Thus, a radiused bearing surface 60 is formed between protrusion 58 and the internal wall surface of the cylindrical segment 54. The axial length between the end wall 52 and the radiused bearing surface 60 is approximately equal to the axial length from the end 46 of pin 16 to the shoulder 36.

At least one slot 62 is provided in ferrule 50 extending from the open end of the ferrule through collar segment 56 and along cylindrical wall segment 54. The slot allows for resilient radially outward expansion of the ferrule and also resilient radially inward contraction. Additional slots 62 may also be provided.

In the preferred embodiment the overall outer diameter of ferrule 50 is equal to or slightly less than the diameter of the shank 18 of pin 16. While the maximum outer diameter across the rounded protuberance 56 is greater than the diameter of the shank 18, and also greater than the diameter of the workpiece holes through which the fastener is installed, the slot 62 permits the open end of ferrule 50 to be radially inwardly compressed so that the effective outer diameter of the ferrule through the collar segment 56 may be accommodated within the workpiece bore 32.

To assemble the fastener of the present invention the ferrule 50 is inserted over the free end of pin 16. Since the internal diameter of the ferrule across the collar segment 56 is less than the diameter of the cylindrical segment 18 of pin 16, the open end of the ferrule is resiliently expanded upon installation of the ferrule 50 over the pin end and as soon as the collar segment moves over the tapered segment 38 ferrule 50 resiliently returns to its initial configuration.

Preferably, the fastener, comprising the pin and ferrule are assembled at a location other than where the joint is assembled. This is done to reduce the likelihood of omitting the ferrule from the joint assembly. All too often, a worker assembling a joint fails to insert a cotter pin, safety wire, or other similar safety device.

The fastener assembly may be installed through the workpieces 12 and 14 simply by pushing on the head 20 of pin 16. Since the maximum diameter across the cylindrical segment of the ferrule is less than the diameter of holes 32a, 32b, and 32c, the fastener with the ferrule 50 in place may pass through the workpieces. Because of slot 62 the collar segment 56 of the ferrule is radially inwardly compressed to allow the complete ferrule and fastener to pass through the workpiece holes. With the collar segment 56 positioned over annular groove 38 at the area of the greatest depth of the groove, the collar segment is inwardly compressed and fits within holes 32a, 32b, and 32c. Upon full insertion of the pin 16 the ferrule clears the exterior surface 26 of workpiece 12 and resiliently outwardly expands to its initial configuration.

Upon application of any force tending to withdraw the pin 16 from the workpiece in which it is installed the collar segment 56 has an effective diameter greater than the diameter of bore 32b and bears against the exterior surface 26 of the workpiece. The pin 16 may be withdrawn to a slight extent until the radiused bearing surface 60 of collar segment 56 abuts against the shoulder 44 on pin 16. Because of the flared segment 38 of annular groove 34, when the bearing surface 60 of ferrule 50 is in abutment with shoulder 44 the surface of flared segment 38 is in close proximity to the inward protrusion 58 of collar segment 56 to preclude radially inward compressability of the ferrule end. Thus the ferrule cooperates with the exterior surface 26 of the workpiece and shoulder 44 to oppose further withdrawal of the pin 16.

Figure 4:
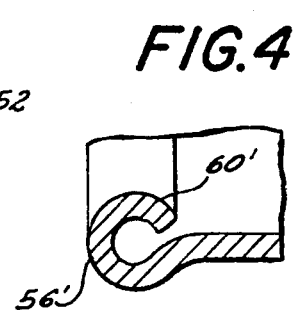
FIG. 4 is a partial sectional view showing an alternative construction for the engagement portion of the retainer member of the present invention.
Figure 5:
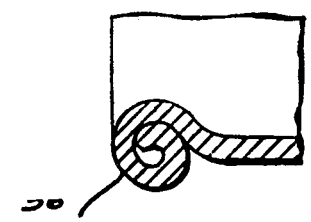
FIG. 5 is a view similar to FIG. 4 showing still another embodiment of the retainer feature of the present invention.

In FIGS. 4 and 5 alternate constructions for the protuberance 56 are shown. In FIG. 4 the protuberance 56' is formed by turning the cylindrical wall segment 54 inwardly so that the bearing surface 60' is formed and in FIG. 5 another alternate construction for the protuberance 56" is shown wherein the end segment is formed by rolling the end of the ferrule 50 inwardly upon itself to form a spiral configuration in cross-section.

It is thus seen that the present invention provides a self-retained fastener member of relatively simple and economical construction which opposes unintentional removal of a fastener from a joint assembly. When removal of the fastener assembly is desired, the ferrule is positioned so that the collar may be inwardly compressed within groove 34 so as to pass through the holes in the workpieces with the fastener as the fastener is removed. The inward compression of collar 56 is accomplished by the cooperation of the radiused exterior surface of collar 56 and the surface of workpiece 12 at the juncture of through bore 32b and surface 26. As a withdrawal force is applied to pin 16 while ferrule 50 is maintained in abutment with surface 26, a compressive force component directed radially inwardly on collar member 56 is applied which, because of slot 62, allows collar member 56 to seat within the deepest segment of groove 34 adjacent shoulder 36. This compression of collar member 56 in groove 34 results in an effective outer diameter across collar member 56 which is equal to or less than the diameter of bore 32b so that fastener 16 with ferrule 50 can be withdrawn.

From the foregoing description it is seen that the present invention provides a self-retained fastener assembly having an integral removal tool. The arrangement disclosed opposes unintentional removal of the fastener assembly and permits the removal of the fastener assembly when desired. Furthermore, in the present invention, the locking device, namely collar number 56, and the removal tool have been combined into one unit, namely ferrule 50.

It is also readily apparent that various modifications can be made to the preferred embodiment of the invention described above and that the scope of the invention will be set out in the appended claims.

What is claimed is:

1. A positive lock self-retained fastener assembly for engagement in a workpiece, said fastener assembly comprising:
   a pin having a shank and an end segment adjacent said shank at one end of said pin, said end segment including an annular groove disposed axially inwardly from said one end of said pin, said annular groove tapering radially outwardly from the juncture of said shank and said groove axially along said pin toward said one end to a shoulder formed axially inwardly from said one end of said pin; and
   a cup-shaped ferrule including collar means formed at the open end thereof to cooperate with said groove and engage said shoulder, thereby to slideably retain said ferrule on said pin end segment, an end wall and a substantially cylindrical wall segment extending from said end wall and terminating in said collar means, said ferrule further having an axially disposed slot formed through said collar means and a portion of said cylindrical wall segment, said slot having a sufficient length such that said collar means resiliently returns to its initial configuration after radial outward expansion thereof over said end segment and radial inward compression thereof when said ferrule is inserted in and removed from the workpiece, said ferrule being movable axially along said end segment between a first position wherein said collar means is adjacent the juncture of said shank and said groove and a second position wherein said collar means is adjacent said shoulder, said collar means being compressible in said first position to operatively allow insertion into and removal of said pin and said ferrule from the workpiece and being operative in said second position to retain said fastener in the workpiece.

2. A positive lock self-retained fastener assembly as defined in claim 1 wherein said end segment includes a cylindrical segment extending from said shoulder to said one end of said pin and wherein the diameter of said cylindrical segment is less than the diameter of said shank to an extent at least equal to twice the wall thickness of said cylindrical wall segment of said ferrule, whereby said pin and ferrule may fit within a receiving bore in a workpiece in which said fastener assembly is installed.

3. A positive lock self-retained fastener assembly as defined in claim 1 wherein the maximum outer diameter through said collar means is greater than the diameter of said shank, and the depth of said annular groove adjacent said shank is sufficient to receive said collar means when said ferrule is compressed so that the effective outer diameter of said collar means when so compressed is less than the diameter of said shank, whereby said fastener assembly may be inserted through a receiving bore in a workpiece.

4. A joint assembly comprising:
a workpiece assembly and a positive lock self-retained fastener assembly, said fastener assembly including a fastener member, said workpiece assembly including a bore for receiving said fastener member therethrough, said fastener member comprising a pin having a shank and an end segment adjacent said shank at one end of said pin, said pin being disposed in said bore with said end segment extending beyond the exterior surface of said workpiece assembly, said end segment including an annular groove disposed axially inwardly from said one end of said pin, said annular groove tapering radially outwardly from the juncture of said shank and said groove axially along said pin toward said one end to a shoulder formed axially inwardly from said one end of said pin, and a cup-shaped ferrule including a collar means formed at the open end thereof to cooperate with said groove and engage said shoulder, thereby to slidably retain said ferrule on said pin end segment, an end wall and a substantially cylindrical wall segment extending from said end wall and terminating in said collar means, said ferrule further having an axially disposed slot formed through said collar means and a portion of said cylindrical wall segment, said slot having a sufficient length such that said collar means resiliently returns to its initial configuration after radial outward expansion thereof over said end segment and radially inward compression thereof when said ferrule is inserted in and removed from said workpiece bore, said ferrule being movable axially along said end segment between a first position wherein said collar means is adjacent the juncture of said shank and said groove and a second position wherein said collar means is adjacent said shoulder, said collar means being compressible in said first position to operatively allow insertion into and removal of said pin and said ferrule from said workpiece bore, and being operative in said second position to cooperate with said exterior surface of said workpiece assembly and said shoulder to retain said fastener in said workpiece assembly.

5. A joint assembly as defined in claim 4 wherein said end segment includes a cylindrical segment extending from said shoulder to said one end of said pin and wherein the diameter of said cylindrical segment is less than the diameter of said shank to an extent at least equal to twice the wall thickness of said cylindrical wall segment of said ferrule, whereby said fastener member and ferrule may fit within said receiving bore in said workpiece assembly in which said fastener assembly is installed.

6. A joint assembly as defined in claim 4 wherein the maximum outer diameter through said collar means is greater than the diameter of said shank, and the depth of said annular groove adjacent said shank is sufficient to receive said collar means when said ferrule is compressed so that the effective outer diameter of said collar means when so compressed is less than the diameter of said shank, whereby said fastener assembly may be inserted through said receiving bore in said workpiece assembly.

7. A joint assembly as defined in claim 4 wherein the effective maximum diameter of said collar means in the uncompressed state thereof is greater than the diameter of said receiving bore when said ferrule is in said second position and said collar means is disposed between the exterior surface of said workpiece assembly and said shoulder to oppose withdrawal of said pin from said workpiece assembly.

8. A joint assembly as defined in claim 4 wherein said workpiece assembly includes at least two workpieces to be joined.

* * * * *